United States Patent
Handing et al.

(10) Patent No.: US 11,331,994 B2
(45) Date of Patent: May 17, 2022

(54) COUPLING ELEMENT FOR CONNECTING VEHICLE COMPONENTS OF AN UNDERFLOOR ARRANGEMENT AND UNDERFLOOR ARRANGEMENT OF A BATTERY-OPERATED MOTOR VEHICLE

(71) Applicant: BENTELER AUTOMOBILTECHNIK GMBH, Paderborn (DE)

(72) Inventors: Christian Handing, Langenberg (DE); Jochem Grewe, Salzkotten (DE); Stefan Schmitz, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 16/881,662

(22) Filed: May 22, 2020

(65) Prior Publication Data
US 2020/0369141 A1 Nov. 26, 2020

(30) Foreign Application Priority Data
May 24, 2019 (DE) ...................... 10 2019 114 006.4

(51) Int. Cl.
*B60K 1/04* (2019.01)
*H01M 50/20* (2021.01)

(52) U.S. Cl.
CPC .............. *B60K 1/04* (2013.01); *H01M 50/20* (2021.01); *B60K 2001/0438* (2013.01); *H01M 2220/20* (2013.01)

(58) Field of Classification Search
CPC ................................ B60K 1/04; H01M 50/20
See application file for complete search history.

(56) References Cited

U.S. PATENT DOCUMENTS 6,227,322 B1 * 5/2001 Nishikawa ........... B62D 29/008
180/68.5
7,118,119 B2 * 10/2006 Amanuma ........... B60K 17/356
280/124.135

(Continued)

FOREIGN PATENT DOCUMENTS

DE 102018101577 A1 8/2018
EP 2623353 A1 8/2013

OTHER PUBLICATIONS

Office Action for German Application No. 10 2019 114 006.4 dated Jan. 10, 2020; 11 pp.

*Primary Examiner* — Jonathan Ng
*Assistant Examiner* — James J Triggs
(74) *Attorney, Agent, or Firm* — Hauptman Ham, LLP

(57) ABSTRACT

The disclosure relates to a coupling element for connecting vehicle components of an underfloor arrangement of a battery-powered motor vehicle, wherein the underfloor arrangement having a battery holder and at least one axle arrangement, the coupling element having at least one first connecting portion for fastening on the axle arrangement, and having at least one planar attachment surface for fastening on the battery holder, wherein the coupling element is designed in the form of an extruded multichamber profile. The disclosure also relates to an underfloor arrangement, for a motor vehicle, having two axle arrangements and a battery holder, arranged between the axle arrangements, wherein the battery holder has a side wall which delimits the battery holder in the outward direction, wherein at least one coupling element according to one of the preceding claims is provided, and connects at least one axle arrangement and the battery holder in a load-directing manner.

17 Claims, 10 Drawing Sheets

(56) References Cited

U.S. PATENT DOCUMENTS

| | | | |
|---|---|---|---|
| 8,535,395 B2 * | 9/2013 | Cai .................... | B23K 15/0006 |
| | | | 29/623.1 |
| 8,936,125 B2 * | 1/2015 | Nakamori ................ | B60K 1/04 |
| | | | 180/68.5 |
| 9,636,984 B1 * | 5/2017 | Baccouche .............. | B60K 1/04 |
| 9,669,873 B2 * | 6/2017 | Buschjohann ......... | B60G 7/001 |
| 10,272,759 B2 * | 4/2019 | Sudhindra ............... | B60L 50/66 |
| 2008/0160394 A1 * | 7/2008 | Takasaki ............... | B60L 3/0007 |
| | | | 429/96 |
| 2009/0152034 A1 * | 6/2009 | Takasaki ................ | B60L 50/66 |
| | | | 180/68.5 |
| 2009/0242299 A1 * | 10/2009 | Takasaki ................ | B60L 50/64 |
| | | | 180/68.5 |
| 2010/0207848 A1 * | 8/2010 | Cok ..................... | G09G 3/3208 |
| | | | 345/76 |

\* cited by examiner

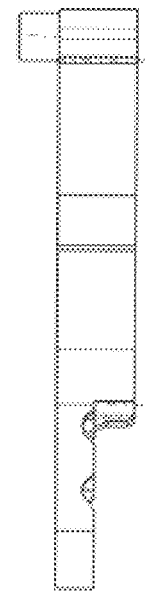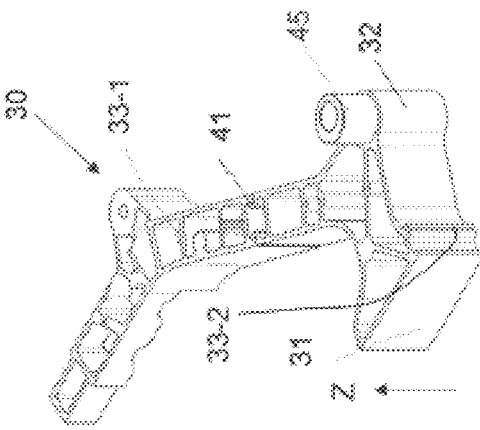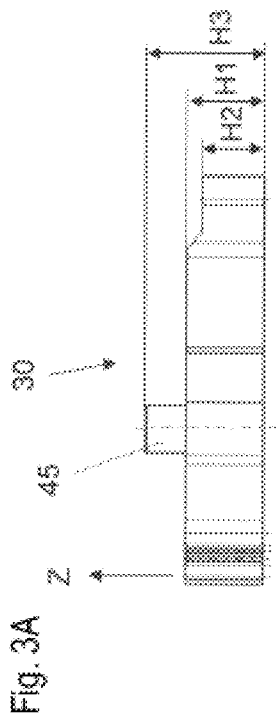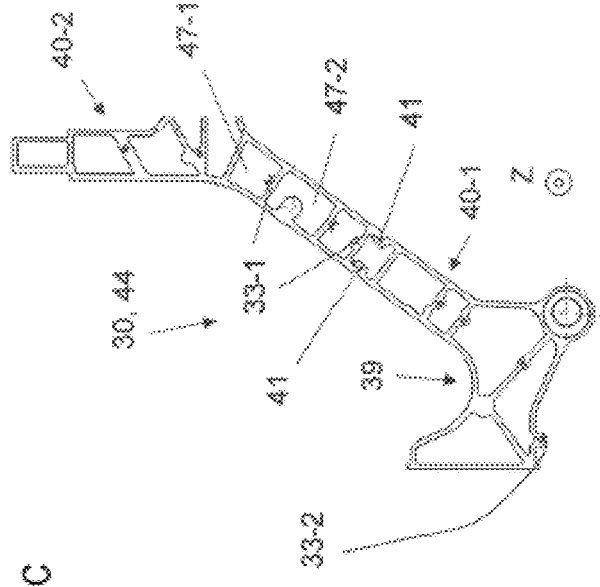

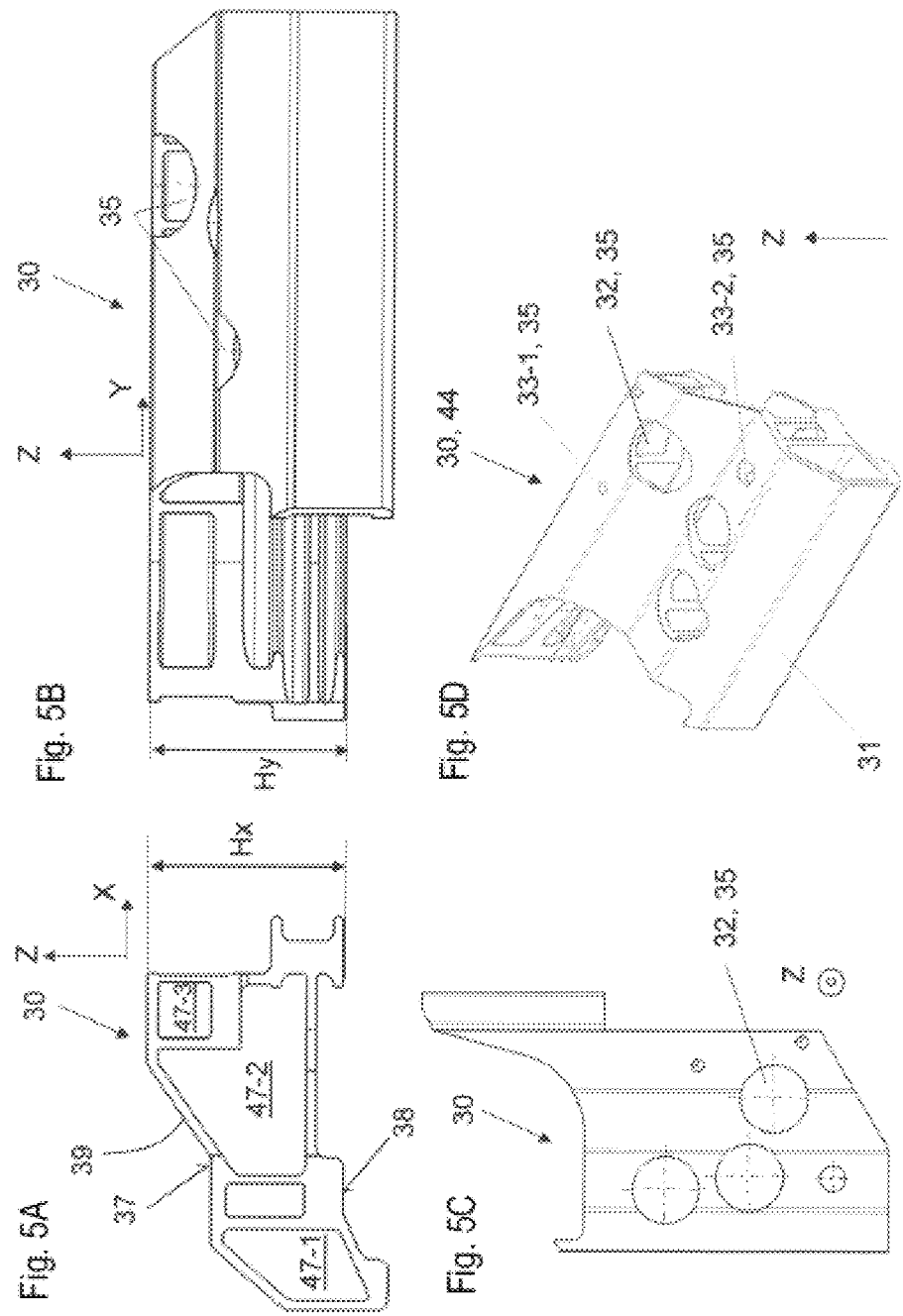

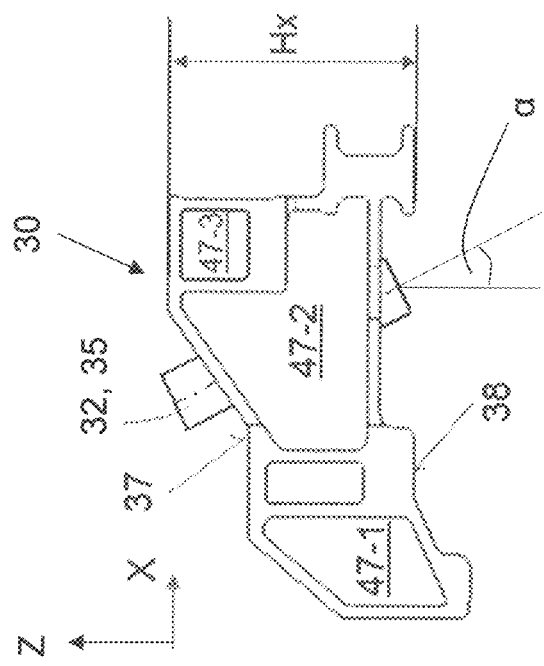

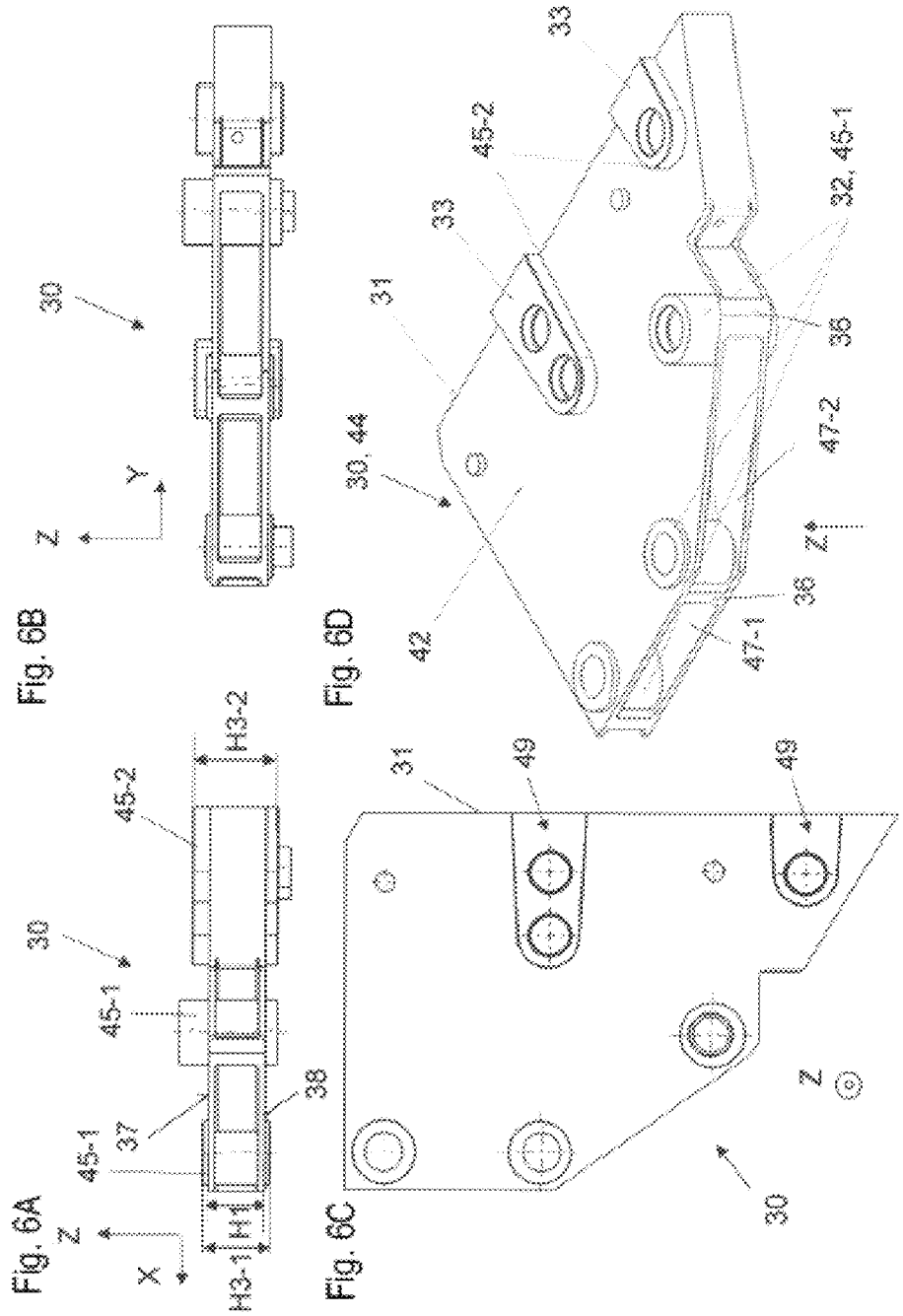

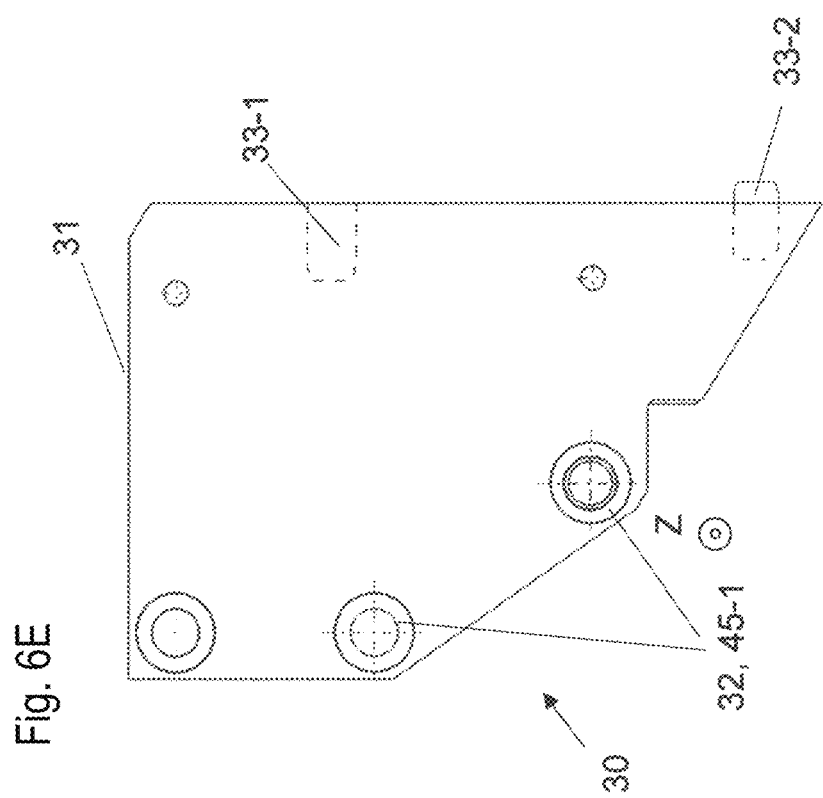

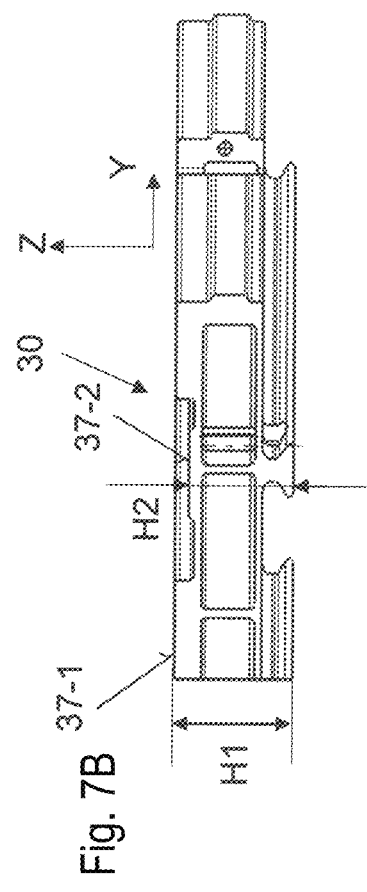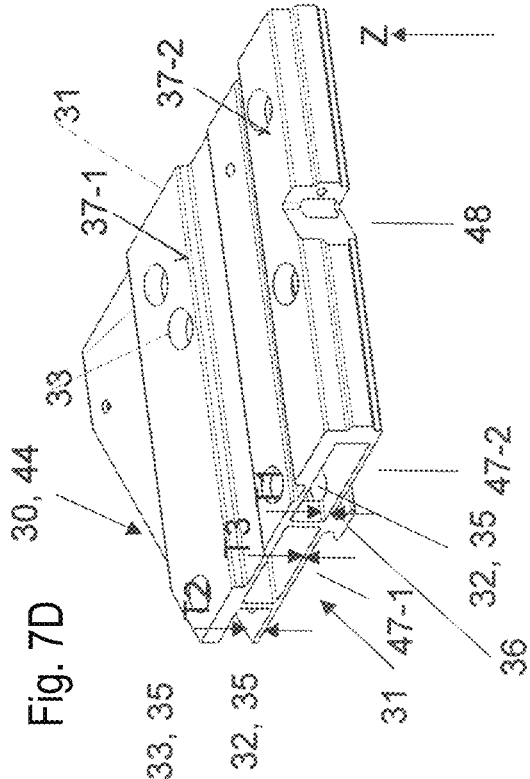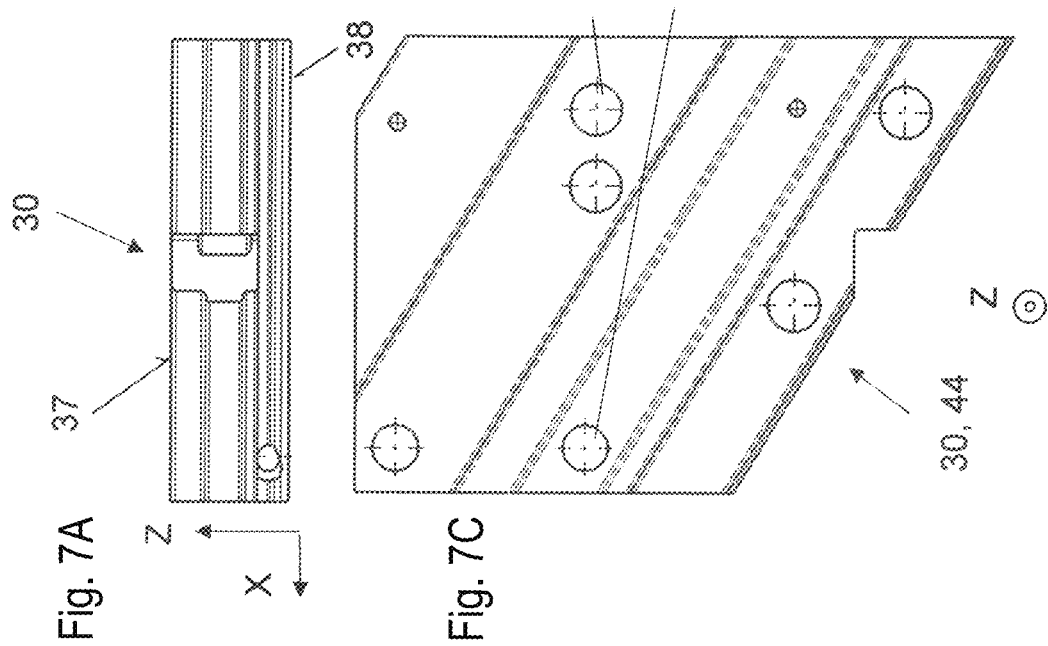

COUPLING ELEMENT FOR CONNECTING VEHICLE COMPONENTS OF AN UNDERFLOOR ARRANGEMENT AND UNDERFLOOR ARRANGEMENT OF A BATTERY-OPERATED MOTOR VEHICLE

CROSS-REFERENCE TO RELATED APPLICATIONS

The present application claims priority from German Application No. 10 2019 114 006.4, filed May 24, 2019, the disclosure of which is hereby incorporated by reference herein in its entirety.

FIELD

The disclosure relates to a coupling element for connecting vehicle components of an underfloor arrangement of a battery-powered motor vehicle. Such coupling elements are used in a large number of applications for example in the region of a battery holder.

BACKGROUND

EP 2 623 353 B1 discloses a coupling element which is designed in the form of an angled bent sheet-metal part. The coupling element has a connecting portion for fastening on a body component, that is to say a longitudinal member, and also has a surface of attachment to the battery holder. Separate transverse struts are provided beneath the battery holder, and these connect two opposite coupling elements, and the battery holder arranged therebetween, to one another.

The disadvantage here is the low level of inherent stability and the lack of energy-absorption capacity of such coupling elements as well as the high level of assembly outlay required for such an underfloor arrangement.

SUMMARY

The object of the present disclosure is therefore to avoid these disadvantages and to propose an improved coupling element and also an improved underfloor arrangement.

A first aspect relates to a coupling element for connecting vehicle components of an underfloor arrangement of a battery-powered motor vehicle, wherein the underfloor arrangement comprises a battery holder and at least one chassis component, such as an axle arrangement, the coupling element having at least one first connecting portion for fastening on the axle arrangement and having at least one planar attachment surface for fastening on the battery holder, wherein the coupling element is designed in the form of an extruded multichamber profile.

The planar surface of attachment to the battery holder ensures that the connection is a stable and sufficiently load-distributing one which in the event of a vehicle crash, even under high loading, does not result in failure of the joint itself and not in local failure of the battery holder.

Designing the coupling element in the form of an extruded multichamber profile gives rise to a high level of inherent stability of the coupling element along with simultaneously good ductility properties. The multichamber profile is produced from aluminum or an aluminum alloy.

The first connecting portion serves for fastening the coupling element on an axle arrangement, wherein the fastening can be released in a non-destructive manner. However, it is also possible for the fastening to be released, when a specific load is exceeded, by a predetermined breaking location within the connecting portion or by a predetermined breaking location on a joining aid itself.

An axle arrangement is understood to mean, within the context of the disclosure, any arrangement which connects opposite vehicle wheels or wheel carriers to one another. The axle arrangement can be a frame-like design or can comprise a frame, wherein the frame is arranged above, or level with, the battery holder, as seen in the vertical direction of the vehicle. The axle arrangement of the underfloor arrangement according to the disclosure can comprise a twist-beam axle, a multilink suspension, an axle equipped with a wheel-hub electric motor or an axle driven by an electric motor or an electric motor itself.

The coupling element can be secured on any component of the axle arrangement, or can be secured on a chassis part.

The coupling element has at least one second connecting portion for connection to a chassis part, such as the axle arrangement, or to a body component, such as a longitudinal member, or for connection to the battery holder. As a result, the loads which occur in the event of a vehicle crash, but also during normal dynamic vehicle operation, can be more uniformly distributed and transferred. The coupling element according to the disclosure therefore also makes it possible, if appropriate, to dispense with the use of a plurality of separate coupling elements, each providing just individual connections. It is thereby also possible for the coupling element for the battery holder, alongside the attachment to the axle arrangement, to provide an additional connection to a ladder-type frame or a self-supporting bodyshell, such as to a longitudinal member.

The first connecting portion is intended to establish a connection at an angle between minus 30 degrees and plus 30 degrees in relation to the vertical direction of the vehicle, or parallel to the vertical direction of the motor vehicle. It is thus possible thereby to create a releasable connection to the axle arrangement, which is arranged fully or to some extent above or beneath the coupling element. It is possible here for the axle arrangement to engage in a fork-like manner around the first connecting portion of the coupling element. In the case of a non-destructive releasable connection, the axle arrangement can have mounts which are adapted for the connecting portion. For the case where the axle component or body component is of non-uniform shape or has an attachment surface which deviates slightly from the vertical direction of the vehicle, the coupling element can provide, according to the disclosure, a connection which is inclined correspondingly by up to +/-30 degrees. This can be achieved by locally likewise inclined profile chambers, profile walls or intermediate walls, or by obliquely introduced sleeve elements forming a connecting portion, as will be explained in more detail in FIG. 5E.

The planar attachment surface comes into full-surface abutment with the battery holder. This means that a high level of load distribution is made possible over a relatively large surface area even in the case of very thin-walled battery holders, and therefore the risk of the battery holder itself being deformed, or rupturing locally, in an undesired manner is reduced. Full-surface abutment also serves to compensate for unavoidable weakenings which occur in the heat-affected zone of a thermally integral joint such as that produced by all-round welding. Friction welding, flash butt welding, and arc welding of the surface of attachment to the battery holder are also possible in principle, as are non-thermal connections such as soldering, clinching and riveting.

The first and/or second connecting portion are/is intended to establish a screw connection. This non-destructive releasable connection has proven successful in practice and, along with the use of known standard connecting elements, is very cost-effective.

At least one connecting portion of the coupling element is formed by a profile chamber. It is possible here for the profile chamber to perform purely supporting functions, if for example a screw is simply plugged through. In addition to the supporting function, an integrated thread makes it possible to establish the actual fastening of the axle arrangement and/or of the body component. The profile chambers, which were produced, and optionally provided with a thread, when the multichamber profile was extruded, provide a stable, durable and reliable connection.

At least one connecting portion of the coupling element is formed by a sleeve element. In this case, the sleeve element should be understood to mean a plug-through point or screw-through point, it being fastened as a separate component in the multichamber profile itself. The sleeve element can be secured in a force-fitting manner, for example by pressing action or a press fit, in a form-fitting manner, for example by screw connection or in an integral manner, for example by welding on the multichamber profile. A combination of these types of connection is also possible. The sleeve element can also be arranged within the abovedescribed profile chamber which further increases the durability and dynamic loading capability by way of a kind of a double-wall formation.

The sleeve element itself and also walls of the multichamber profile which enclose or delimit the sleeve element, or profile chambers of the multichamber profile, is dimensioned such that it is not possible for the screw connection to rupture or break off within normal load parameters. The sleeve element and/or walls or the profile chamber in the connecting portion have/has a greater material strength and/or wall thickness in relation to other portions of the multichamber profile.

The sleeve element can be of non-circular external shape, if a thread is integrated in the sleeve element. As a result of the additional form fit which occurs, the connection of the sleeve element to the coupling element is relieved of loading even under a high tightening torque. For this purpose, it is possible for the sleeve element to be oval or polygonal or to have grooves, notches or undercuts.

In a development, the connecting portions have an upper side and an underside. The upper side of a first connecting portion here is spaced apart from the upper side of another connecting portion in the vertical direction of the vehicle and/or the underside of a first connecting portion is spaced apart from the underside of another connecting portion in the vertical direction of the vehicle. This means that the coupling element provides connecting portions, or coupling points in relation to the axle component and/or to the body component, at different positions. It is possible for vehicle parts arranged at different positions in the vertical direction of the vehicle to be coupled to one another. The coupling element acts as a kind of height adapter.

The spacing apart of the upper sides and/or undersides is provided by mechanical processing of the multichamber profile. The extrusion-induced geometry of the multichamber profile is altered here over the longitudinal axis of the profile and/or over the cross section thereof. The processing can take place without cutting, by forming methods such as for example press forming or bending, but with material being removed, for example by milling or cutting. A combination of cutting and non-cutting processing methods is also conceivable. This has the advantage that geometrically complex coupling elements can be produced even from relatively simple multichamber profiles.

The coupling element has a longitudinal profile axis which extends perpendicularly in relation to the vertical direction of the vehicle. In other words, the multichamber profile extends within a plane defined by the transverse direction of the vehicle and longitudinal direction of the vehicle, such as in the longitudinal direction of the vehicle. The longitudinal axis of the profile typically coincides, during the extrusion operation, with the direction of extrusion.

It is further the case that at least one connecting portion is formed by through-passages in an upper profile wall and in a lower profile wall of the multichamber profile. The wall through-passages can serve, for example, as screw-through points. In the case of a multichamber profile which is extruded in the longitudinal direction or transverse direction of the vehicle, it is possible here for the wall through-passages to be formed in an upper and lower profile wall, in order to provide connection in the vertical direction of the vehicle. A connecting portion can be delimited here by the profile walls which delimit the wall through-passages and optionally by an intermediate wall which extends between the upper and lower profile walls.

Provision can further be made for the upper side and/or underside of the connecting portions to be formed by an upper profile wall and/or a lower profile wall, wherein the spacing apart of the upper sides and/or undersides are provided by locally different wall thicknesses of the profile walls. In the case of a multichamber profile with a longitudinal profile axis within a plane defined by the transverse direction and longitudinal direction of the vehicle, this has the advantage that, during the extrusion operation, different attachment positions can be provided without any additional processing steps being required. The wall thickness can be produced, during the extrusion operation, with small transition lengths of only a few millimeters along with relatively large differences in wall thickness of up to 5 millimeters, or 1 to 3 millimeters. This gives rise to a high level of flexibility in the case of the connection of axle arrangement and body component.

As an alternative, or in addition, to the configuration with different wall thicknesses, provision can be made for the upper side and/or underside of the connecting portions to be formed by an upper profile wall and/or lower profile wall, wherein the spacing apart of the upper sides and/or undersides are formed by different profile chambers of the multichamber profile. This means that profile chambers which are formed during the extrusion operation have different cross-sectional configurations, such as different heights or height profiles, and therefore this gives rise, once again, to flexible attachment options as a result of the connecting portions thus configured.

The coupling element has a longitudinal profile axis which extends parallel to the vertical direction of the vehicle. In this case, the profile walls or intermediate walls extend parallel to the vertical direction of the vehicle. The advantage is that there is no longer any need for any manual wall through-passages to be produced mechanically or by cutting, and therefore the connecting portions can be formed either by a profile chamber in the multichamber profile itself or by insertion sleeves being introduced. It is optionally possible for a coupling element which is extruded in the vertical direction of the vehicle to be partially closed by a closure panel on an upper side and/or an underside.

The closure panel can be formed just locally or in adaptation to the contour of the multichamber profile. However, it is also possible for the closure panel to be an integral constituent part of a vehicle floor panel. The advantage of the local arrangement of the closure panel is that at least those connecting portions which are intended for screw connection in the vertical direction of the vehicle can remain free of the closure panel and it is therefore possible to dispense, for example, with the production of a wall through-passage for the screw connection.

In a development, the coupling element can also be formed in a number of parts made up of a first individual profile and at least one second individual profile, wherein the individual profiles are connected to one another in a form-fitting and/or integral manner. This gives rise to further degrees of design freedom in providing points of attachment to the axle arrangement or to body components.

On their mutually facing walls, the individual profiles have complementary-formation connecting elements, such as in the manner of a groove-and-tongue connection, and therefore they are connected to one another in a form-fitting manner. Two individual elements can be connected to one another here by axial pushing-in action or by virtue of one individual profile being latched onto, or clipped into, the other individual profile. This has advantages for assembly or preassembly, even if an additional integral connection, for example adhesive bonding or welding, should then also take place.

Furthermore, the combination capability of the individual profiles results in a higher level of variability in the production and configuration of the coupling elements. On the one hand, this relates to the use of different materials. On the other hand, it is also possible for different second individual profiles to be combined with a first individual profile in order for the coupling elements to be adapted to different vehicles of a model range.

It is further the case that one individual profile is arranged at least to some extent within a further individual profile. The outer individual profile is thus at least locally supported, and reinforced, the inner individual profile. Conversely, it is also the case that the outer individual profile supports the inner individual profile, at least in an overlapping region. In addition, once again different points of attachment can be provided in a very flexible manner. At least one of the individual profiles, the inner individual profile, is designed in the form of a multichamber profile. One of the individual profiles has a longitudinal profile axis which extends at an angle, such as at right angles, in relation to a longitudinal profile axis of the other individual profile. For example, it is possible for the inner individual profile to be designed, and arranged, for extrusion in the vertical direction of the vehicle, whereas the outer individual profile has its longitudinal profile axis running in the longitudinal direction of the vehicle or at an angle between 0 and 90° in relation to the same.

It can also be advantageous if one individual profile has an extent in the vertical direction of the vehicle which differs, at least locally, from another individual profile. The same advantages are achieved as a for a single-part coupling element with different cross-sectional configurations and/or different height profiles. Added to this is the fact that the individual profiles can be formed from different materials, such as from different metal alloys. It is thus possible, by way of suitable selection of materials, to configure the coupling element in a load-adjusted manner and to provide for example a region which is resistant to bending or buckling and a region which is more readily ductile and deformable.

The coupling element has at least one intermediate wall, which extends from the attachment surface in the direction of the first connecting portion and is designed to transmit a load. The intermediate wall therefore serves as a load path and, in the case of a multichamber profile which is extruded in the vertical direction of the vehicle, can be optimized in terms of topology and weight, for example can be configured bionically and/or in line with nature.

The intermediate wall can run continuously or be interrupted or segmented. The intermediate wall constitutes a load path between the connecting portion and attachment surface in the coupling element. The intermediate wall can also branch in meandering fashion, in order to provide for uniform load distribution. The branching can also be such that the ends of the branches of an intermediate wall merge into the surface of attachment to the battery holder.

The coupling element has at least one wall portion which constitutes a predetermined deformation location such that, when a defined first load level is exceeded, the coupling element is specifically deformed, wherein the predetermined deformation location is formed by a reduction in the wall thickness or in the yield strength or by the formation of a wall through-passage, of a slot or of a cross-sectional tapering, or of a stamped formation. The specific deformation triggered by a vehicle crash can be in the form of uniform forming or of bending about a deformation axis. As a result, crash-induced loads and impact energy can be both absorbed to some extent and reproducibly transferred, and distributed, by the coupling element.

A further aspect of the disclosure relates to an underfloor arrangement for a motor vehicle, comprising two axle arrangements and a battery holder, which is arranged between the axle arrangements, wherein the battery holder has a side wall which delimits the battery holder in the outward direction. The underfloor arrangement is characterized in that at least one coupling element is provided as described above, and connects at least one axle arrangement and/or a body component and the battery holder in a load-directing manner. A body component can be understood to mean, a longitudinal member, for example a body sill, or a crossmember, for example a lower seat crossmember. It is thus possible, in the event of a side impact, for loads from the impact region to be to some extent absorbed, and transferred, via the longitudinal crossmember, coupling element and battery holder. In addition, or as an alternative, it is thus possible, in the event of a frontal impact or rear-end impact, for loads from the impact region to be to some extent absorbed, and transferred, via at least one front or rear longitudinal member and/or the axle arrangement and the battery holder. Local overloading can be avoided, as can undesired deformation or resulting intrusion into the passenger compartment or the sensitive interior of the battery holder.

In a development, the coupling element has at least one intermediate wall, which extends from the connecting portion up to the surface of attachment to the battery holder and is designed to transmit a load, wherein, in addition, the battery holder has a strut, which extends between two opposite side walls of the battery holder, wherein the strut is arranged opposite the intermediate wall of the coupling element, and therefore a load is directed from a connecting portion of the coupling element, via the intermediate wall, the side wall and the strut, into an opposite side wall.

Opposite means that the strut is arranged in a projected extension of the intermediate wall of the coupling element or, in a projected extension of the strut, the intermediate wall ends up at, or merges into, the attachment surface. At least one strut extends in the longitudinal direction of the vehicle.

The strut can be designed in the form of a round or polygonal hollow profile or in the form of a top-hat profile. The strut has its ends connected not just to the side walls of the battery holder, but also to a base or underride protector of the battery holder. This results in a high level of stability and rigidity and in sufficient resistance to flexing on account of the battery weight and in the event of a vehicle crash.

The side wall of the battery holder can be formed from hollow-chamber profiles. Like the coupling element, it is thus also possible for the hollow-chamber profile of the side wall to absorb, and transfer, crash energy as a result of being specifically deformed. The side walls are formed with hollow-chamber profiles running around the battery holder, that is to say on all sides. In a development of the underfloor arrangement, the side wall of the battery holder is a crash frame, which comprises hollow-chamber profiles and, when a defined second load level is exceeded, is deformed, wherein the second load level is greater than a first load level, at which the coupling element is deformed.

A hollow-chamber profile can also be designed in the form of a multichamber profile, wherein a partition wall subdivides the hollow profile into an upper sub-chamber and a lower sub-chamber. The multichamber profile can be produced, for example, by extrusion, press forming or roll forming.

Provision can also be made for the strut to be formed in a diagonally running manner above or beneath the battery holder and/or to be supported laterally on the crash frame. It is thus advantageous for the strut to be arranged in the plane of a cover or base of the battery holder, in other words above or beneath the batteries or the interior of the battery holder. This configuration also achieves a high level of load distribution in the event of a vehicle crash, without putting the batteries at risk.

BRIEF DESCRIPTION OF THE DRAWINGS

The disclosure will now be described in more detail by means of various exemplary embodiments and with reference to schematic illustrations, in which:

FIGS. 3A-3D show a second exemplary embodiment of a coupling element according to the disclosure, FIGS. 5A-5E show a fourth exemplary embodiment of a coupling element according to the disclosure, FIGS. 6A-6E show a fifth exemplary embodiment of a coupling element according to the disclosure, FIGS. 7A-7D show a sixth exemplary embodiment of a coupling element according to the disclosure.

In the figures, the same reference signs are used for identical or equivalent components, even if and when a repeat description is dispensed with for reasons of simplification.

DETAILED DESCRIPTION

Figure 1:
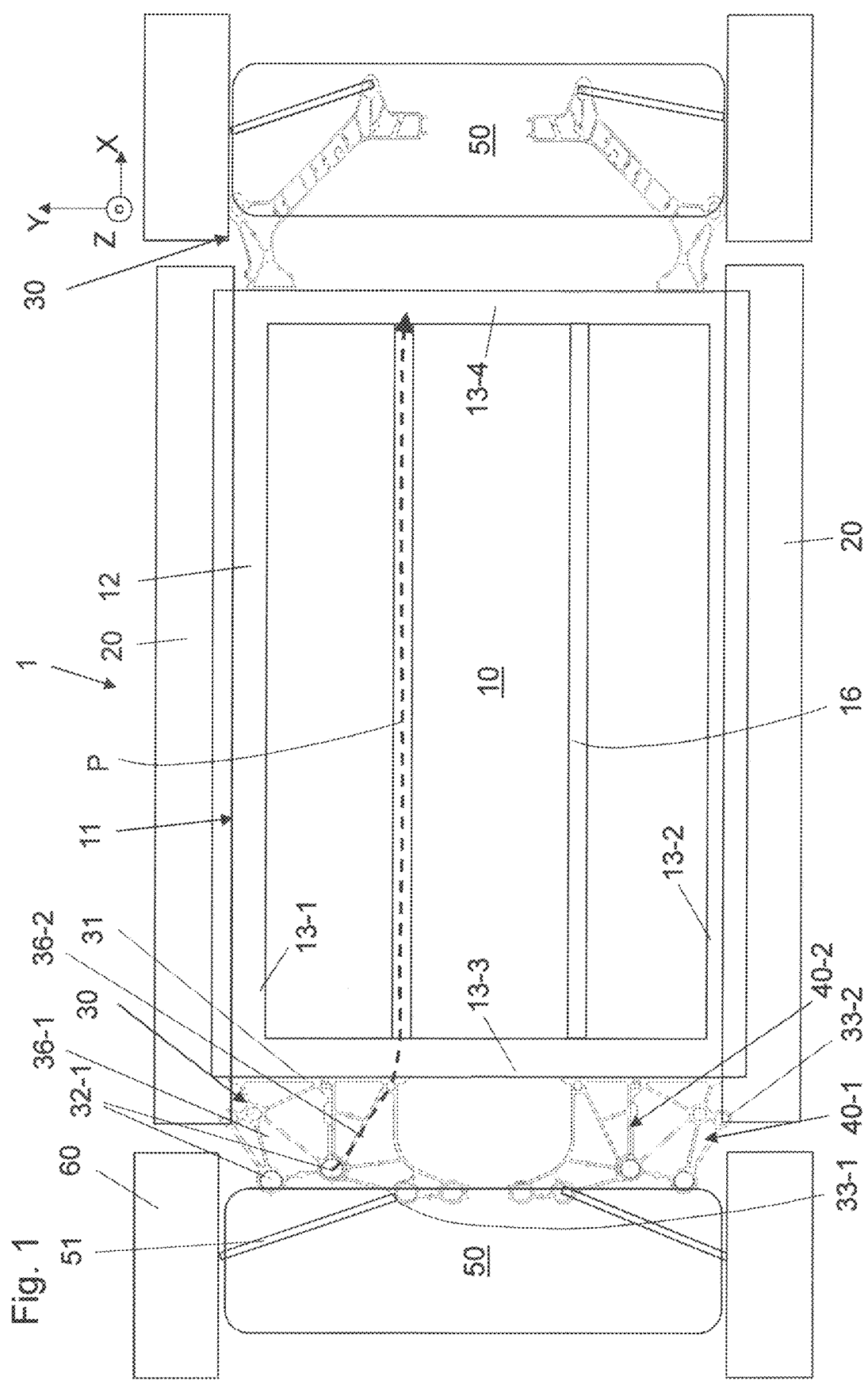
FIG. 1 shows an underfloor arrangement according to the disclosure of a motor vehicle.

FIG. 1 shows an exemplary embodiment of an underfloor arrangement of a motor vehicle according to the present disclosure. The underfloor arrangement 1 comprises two axle arrangements 50 at a front and a rear end of a vehicle and also a battery holder 10 between the two axle arrangement 50. The axle arrangement serves for the fastening or suspension of the wheels 60 and of the electric motors of the motor vehicle. The battery holder serves to accommodate traction batteries of the motor vehicle for the purpose of supplying the electric motors. Two coupling elements 30 extend between an axle arrangement and the battery holder and connect the axle arrangement to the battery holder in a load-directing manner. The coupling elements have a first connecting portion 32 for fastening on the axle arrangement 50. The coupling elements 31 can have further connecting portions 33-1 and 33-2 for fastening the axle arrangement 50 or a body component, in this case in the form of a longitudinal member 20. One end of each coupling element 30, said end being located opposite the axle arrangement 50 has formed on it planar attachment surfaces 31 for fastening on the battery holder 10, said attachment surface coming into full-surface abutment, or even just partial-surface abutment, with the battery holder 10. Crash-induced loads or forces from a frontal impact or rear-end impact can be introduced from the axle arrangement, via the connecting portion 32 and 33, into the coupling element 30. For this purpose, the coupling element 30 contains intermediate walls 36, which transfer the load from the connecting portions 32-1, 32-2, 33-1, 33-2 into the attachment surface 31 and the battery holder 10. The coupling element 30 is designed in the form of an extruded multichamber profile 47 and is formed from a light-metal alloy. This ensures a stable and durable coupling between the components, but at the same time, in the event of a crash, some of the crash energy can be dissipated within the multichamber profile of the coupling element 30. Forces related to driving dynamics can be transferred from the wheels 60, via the axle arrangement 50 and the coupling elements, to some extent to the battery holder 10.

The battery holder has a side wall 11 which delimits the battery holder 10 in the outward direction and is in contact with the attachment surfaces 31 of the coupling element 30.

The side wall 11 of the battery holder comprises hollow-chamber profiles 13, which run at least on the sides of the vehicle and parallel to two longitudinal members 20 of the underfloor arrangement 1. The battery holder can additionally be fastened on the longitudinal members 20 via the hollow-chamber profiles 13-1 and 13-2. Two struts 16 extend between two opposite hollow profiles 13-3, 13-4 of the side wall 11. The strut 16 is arranged opposite one of the intermediate walls 36, and therefore a load is directed from the connecting portion 32 of the coupling element 30, via the intermediate wall 36, the side wall 10 and the strut 36, into an opposite side wall 10. This results in the formation of a load path P.

As a result, a load is directed from the connecting portions 32 and 33 of the coupling element 30, via the intermediate walls 36-1, 36-2, the hollow-chamber profile 13 and the strut 16 of the side wall 11, into the opposite hollow-chamber profile 13.

In the case where the side wall 11 has hollow-chamber profiles 13 on all sides of the battery holder 10, a crash frame is formed, and this crash frame protects the traction batteries within the battery holder against mechanical damage both in the event of a frontal impact or rear-end impact and in the event of a side impact.

The following FIGS. 2A, 3A, 4A, 5A, 6A, and 7A show in each case a cross-sectional view in the XZ plane of the motor vehicle, whereas FIGS. 2B, 3B, 4B, 5B, 6B, and 7B show in each case a longitudinal-section view in the YZ plane of the motor vehicle. FIGS. 2C, 3C, 4C, 5C, 6C, 7C and 8C show plan views of individual exemplary embodiments, whereas FIGS. 2D, 3D, 4D, 5D, 6D, 7D and 8D show isometric views.

FIGS. 2A-2D show a first exemplary embodiment of a coupling element 30 made up of a single extruded multichamber profile 44. The coupling element 30 is connected to a side wall 11 of a battery holder 10 by a planar attachment surface 31. The coupling element 30 has a plurality of cross-sectionally closed profile chambers 47, which are delimited, and separated off from one another, by walls 34. Intermediate walls 36 connect a connecting portion 32-1 to the attachment surface 31. Further connecting portions 32-2, 33-1, 33-2 are formed by cross-sectionally opened or closed profile chambers 47-1, 47-2.

It can be seen that the walls 34 extend in the vertical direction Z of the vehicle. The coupling element 30 has a longitudinal profile axis 46 which extends parallel to the vertical direction Z of the vehicle. In other words, the multichamber profile 44 is thus designed for extrusion in the vertical direction Z of the vehicle.

The connecting portion 32-1 has an upper side 37-1 and an underside 38, and another connecting portion 33-1, 33-2 has an upper side 37-2, wherein the upper side 37-1 of the connecting portion 32-1 is spaced apart from the upper side 37-2 of the other connecting portion 33-1, 33-2 in the vertical direction Z of the vehicle. It is also the case in this exemplary embodiment that the spacing apart of the upper sides 37-1, 37-2 is provided by mechanical processing of the multichamber profile 47 such that the coupling element 30 is formed, as far as the first connecting portion 32-1 is concerned, with a height H1 as the distance between the upper side 37-1 and the underside 38 and, as far as a further connecting portion 32-2 is concerned, with a reduced height H2 as the distance between the upper side 37-2 and the underside 38.

The connecting portions 32-1, 32-2, 33-1, 33-2 are intended to establish a screw connection, wherein the screw connection or screw-connection axis is realized in the vertical direction of the vehicle.

Figure 2A:
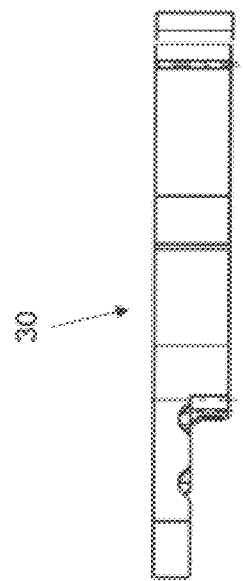
FIGS. 2A-2D show a first exemplary embodiment of a coupling element according to the disclosure.
Figure 2B:
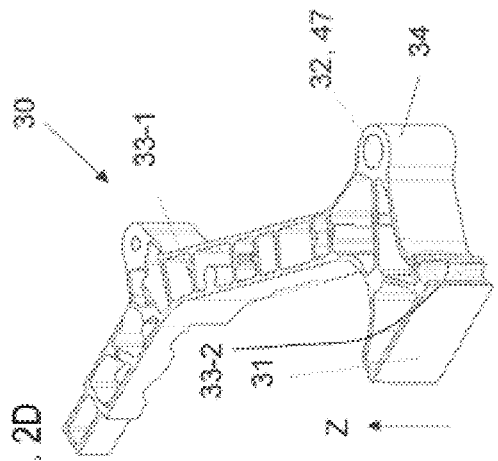
Figure 2C:
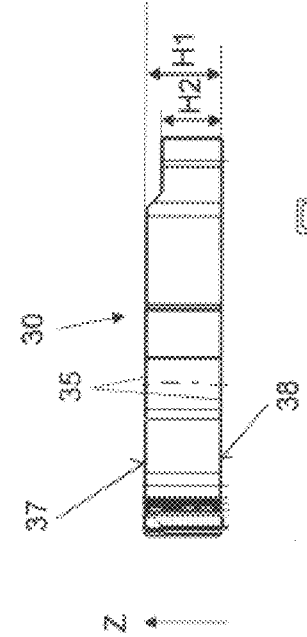
Figure 2D:
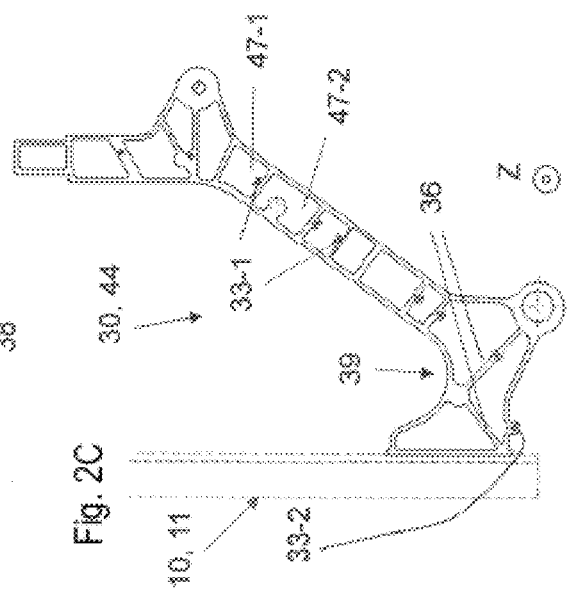

It can be seen in FIG. 2C that a wall portion can be designed in the form of a predetermined deformation location 39, and adjacent portions of the multichamber profile is tapered. In this case, provision is made for specific bending or rotation with dissipation of crash energy within the predetermined deformation location when a predetermined load is exceeded. This can also help to protect the battery holder.

FIGS. 3A-3D show a second exemplary embodiment of a coupling element 30. It differs in two aspects from the first exemplary embodiment according to FIGS. 2A-2D.

Instead of being formed in one part, the coupling element 30 is now formed in a number of parts made up of a first individual profile 40-1 and a second individual profile 40-2. The individual profiles 40-1, 40-2 are connected to one another in a form-fitting manner and optionally in an integral manner by welding or adhesive bonding. On their mutually facing walls 34, the individual profiles 40-1, 40-2 have complementary-formation connecting elements 32, 33 in the manner of a groove-and-tongue connection, are connected to one another in a form-fitting manner.

The two individual profiles 40-1 and 40-2 each comprise an extruded multichamber profile 44. The two individual profiles 40-1, 40-2 can have identical light-metal alloys or can have for example different aluminum alloys.

It is thus possible for the first individual profile 40-1 to be formed from a more ductile alloy so that, under a defined load level, it dissipates kinetic energy from a crash by specific deformation. The second individual profile 40-2, in contrast, can be formed from a higher-strength alloy and, with buckling resistance and load-directing properties, can ensure the connection between the connecting portion 33 and the first individual profile.

The second difference from the first exemplary embodiment is the first connecting portion 32-1 of the coupling element 30 being in the form of a sleeve element 45. The sleeve element 45 projects in the vertical direction Z of the vehicle in relation to an upper profile wall 42, and this gives rise to a height H3 as the distance between an upper side 37-1 of the first connecting portion 32-1 and an underside 38.

FIGS. 4A-4D show a further exemplary embodiment according to the disclosure of a coupling element 30. The latter, as in FIGS. 3A-3D, is also formed from two individual profiles 40-1, 40-2, which are connected to one another with a form fit, in the manner of a groove-and-tongue connection, in the region of connecting elements 41. The individual profiles 40-1, 40-2, once again, are designed for extrusion in the vertical direction Z of the vehicle and have connecting portions 32-1, 32-2, which are formed by sleeve elements 45. The two individual profiles 40-1, 40-2 form a common attachment surface 31 for coupling to a side wall 11 of a battery holder 10.

Figure 4B:
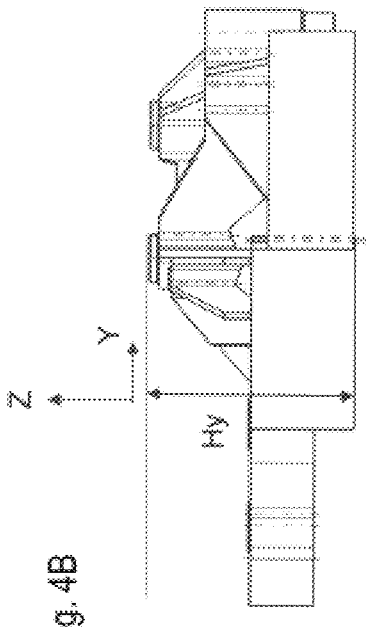
FIGS. 4A-4D show a third exemplary embodiment of a coupling element according to the disclosure.
Figure 4A:
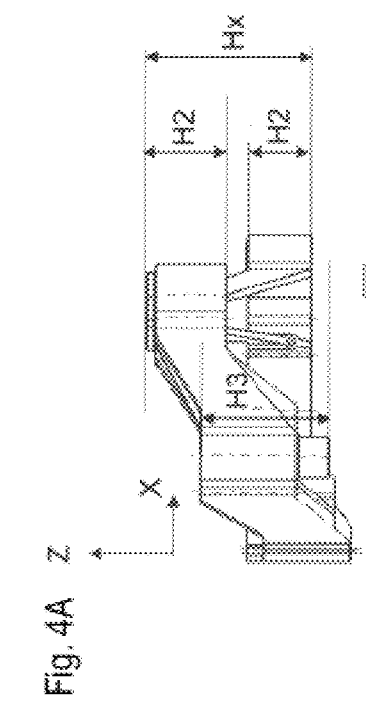
Figure 4D:
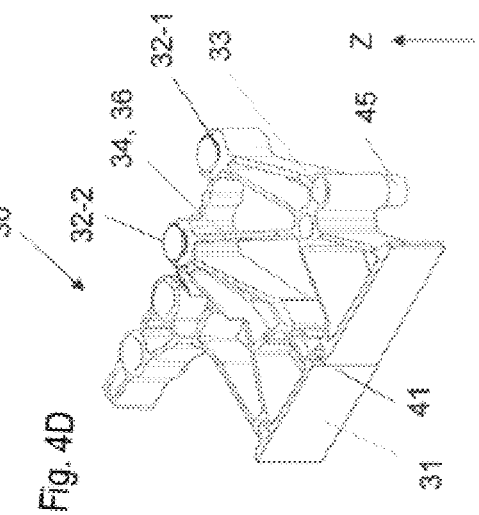
Figure 4C:
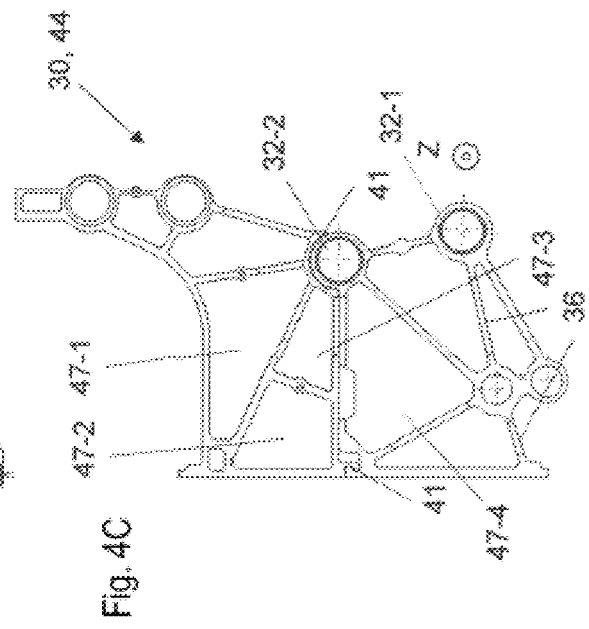
Figure 8B:
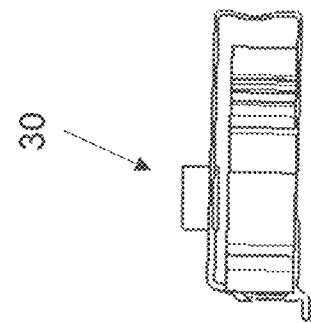
FIGS. 8A-8D show a seventh exemplary embodiment of a coupling element according to the disclosure.
Figure 8A:
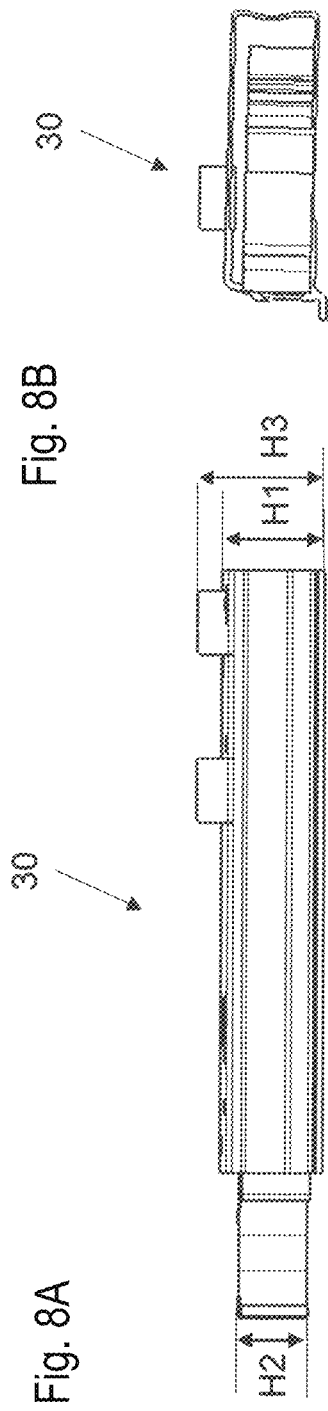
Figure 8D:
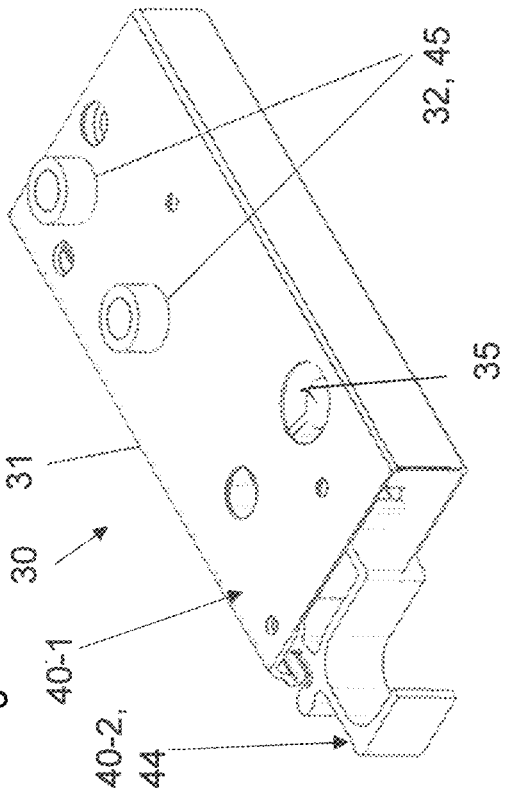
Figure 8C:
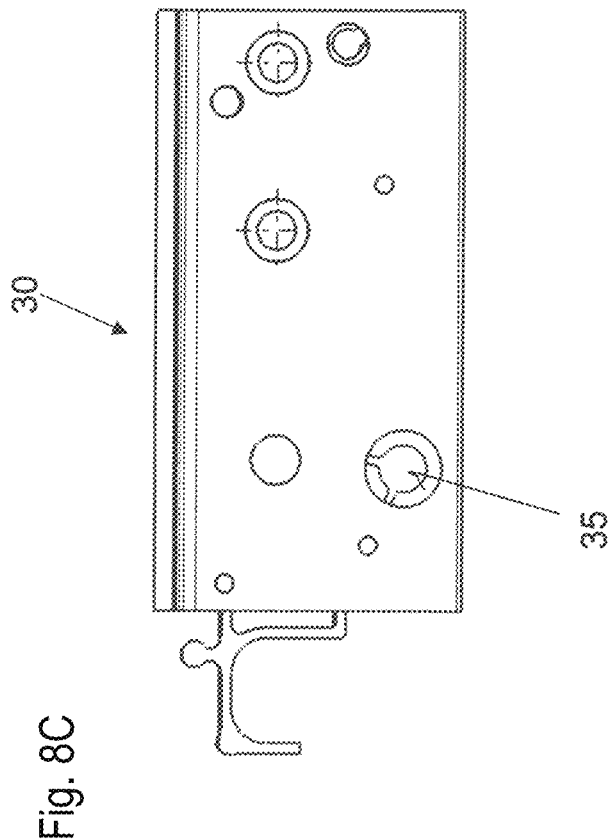

An individual profile 40-1 illustrated in the image plane of FIG. 4C at the bottom has further connecting portions 33. All or some of the connecting portions are formed by sleeve elements 45. The sleeve elements 45 can have different dimensions and be arranged at different heights. Instead of a sleeve element 45, at least one connecting portion 32, 33 can also be formed by a profile chamber 47. In this case, it is possible for a thread to be integrally formed in the profile chamber or for a screw to be plugged through.

The connecting portions 32-1, 32-2 have upper sides 37 at different positions in the vertical direction Z of the vehicle and undersides 38 at to some extent different positions in the vertical direction Z of the vehicle, the different connecting portions 32-1, 32-2 therefore being spaced apart from one another in the vertical direction Z of the vehicle.

It is also the case in this exemplary embodiment that the spacing apart of the upper sides 37 is provided by mechanical processing of the individual profiles 40-1, 40-2 such that the coupling element 30 is formed, as far as the connecting portions are concerned, with both different heights H2, H3 and a distance between the upper side 37 and the respectively associated underside 38, but also the already described different positions in the vertical direction Z of the vehicle. The mechanical processing is carried out here both from the upper side 37 and from the underside 38, and it is therefore also the case that the undersides 38 of the connecting portions 32-1, 32-2 are spaced apart from one another in the vertical direction Z of the vehicle. The mechanical processing takes place, with material being removed, for example by milling or cutting obliquely in relation to the direction of extrusion.

FIGS. 5A-5E show a further exemplary embodiment of a coupling element 30 made up of an extruded multichamber profile 44. The coupling element 30 is in one part and extruded in the transverse direction Y of the vehicle, and therefore an upper profile wall 42 and a lower profile wall 43, which is spaced apart from the upper profile wall, enclose profile chambers 47 closed in different and a plurality of walls 34. It is possible to see a first connecting portions 32-1 and further connecting portions 32-2 and 33, which are formed by through-passages 35 in the upper profile wall 42 and in the lower profile wall 43 of the multichamber profile 44. The connecting portions 32, 33 are intended to establish a screw connection in the vertical direction Z of the vehicle.

The coupling element 30 has a planar attachment surface 31 for coupling to a side wall (not illustrated) of a battery holder.

The connecting portions 32-1, 32-2 have different upper sides 37-1, 37-2 and undersides 38-1, 38-2, wherein the upper side 37-1 of one connecting portion 32-1 is spaced apart from the upper side 37-2 of another connecting portion 32-2 in the vertical direction Z of the vehicle and the underside 38-1 of one connecting portion 32-1 is spaced apart from the underside 38-2 of the other connecting portion 32-2 in the vertical direction Z of the vehicle.

Different upper sides 37 and undersides 38 of the connecting portions 32-1, 32-2, 33 are formed by the upper profile wall 42 and lower profile wall 43, wherein the spacing apart of the different upper sides 37 and undersides 38 is provided by different profile chambers 47-1, 47-2 of the multichamber profile 44. It can also be seen that the first connecting portion 32-1 is formed at the same time by the profile chambers 47-2 and 47-3. It is possible here for a wall thickness of the upper profile wall 42 and/or lower profile wall 43 to be constant in each case and/or in relation to one another or, as illustrated, to differ within the upper profile wall 42 and/or the lower profile wall 43. It can additionally be seen in FIG. 5A that a height profile Hx is tapered in a central portion to form a predetermined deformation location 39. This means that, when a defined threshold value of the load is exceeded, the coupling element is specifically deformed, with energy being dissipated in the process. The multichamber profile is crumpled in a concertina-like manner on the upper side 37 and underside 38.

A variation of the exemplary embodiment according to FIGS. 5A-5D is illustrated with reference to FIG. 5E. The only difference is that a connecting portion 32 is formed by a sleeve element 35 which is arranged within the profile chamber 47-2 and extends all the way through the latter. The sleeve element 35 projects outward both from the upper side 37 and from the underside 38. The sleeve element 35 runs at an acute angle alpha ($\alpha$) in relation to the vertical direction Z of the vehicle. As is also the case in the preceding exemplary embodiments, the sleeve element 35 thus serves to establish a connection of the coupling element 30 in the vertical direction of the motor vehicle.

FIGS. 6A-6E show a further exemplary embodiment of a coupling element 30 made up of an extruded multichamber profile 44 with the profile chambers 47-1, 47-2. An inherently rigid and durable coupling element 30 is provided by the profile chambers 47 and walls 34 which delimit the same.

It is possible to see connecting portions 32, which are formed by sleeve elements 45. The sleeve elements 45 are inserted into the multichamber profile 44 and fastened therein. It is also possible to see two apertures of the multichamber profile 44. Starting from a planar attachment surface 31, which is illustrated in the image plane of FIGS. 6A and 6C, the apertures extend into a central surface-area portion. Insert elements 49 are fastened in the apertures of the coupling element 30, these insert elements having the same function as the previously mentioned sleeve elements 45 and forming further connecting portions 33. It is possible here for the insert element 49 itself optionally also to comprise a further sleeve element 45-2, as is indicated in FIG. 6A. The first and further connecting portions 32, 33 are intended to establish a screw connection in the vertical direction Z of the vehicle. The advantage of the insert elements 49 with a non-circular cross section in comparison with illustrated sleeve elements 45 with a circular cross section is that rotation prevention, such as during screw connection, is ensured.

It is possible to see an upper side 37-1 of the connecting portion 32, and an upper side 37-2 of the connecting portion 33, these projecting from an upper profile wall 42 in the vertical direction of the vehicle, and also an underside 38-1 of a first connecting portion 32 and an underside 38-2 of the further connecting portion 33. Spacing apart of the respective upper sides 37-1 and 37-2 and of the respective undersides 38-1 and 38-2 is provided by different lengths or heights H1, H2, H3, H4 of the sleeve elements 45, 45-2 and of the insert elements 49. This provides for different attachment options of the connecting portions at different height positions in the vertical direction Z of the vehicle.

A variation of the exemplary embodiment according to FIGS. 6A-6D is illustrated with reference to FIG. 6E. One difference is that further connecting portions 33-1 and 33-2 are intended such that the coupling element 30, rather than being connectable in the vertical direction of the vehicle, is connectable in the transverse direction Y of the vehicle. For this purpose, the connecting portions 33-1 and 33-2 are formed from insert elements 49 which are introduced laterally into an aperture or opening in a wall of the coupling element by virtue of an introduction movement in the transverse direction of the vehicle. It is also the case that the coupling element 30 in FIG. 6E has a surface 31 of attachment to the battery holder 10 which, in comparison with FIGS. 6A-6D has been rotated through 90 degrees and is formed at the top in the image plane.

FIGS. 7A-7D show a further exemplary embodiment of a coupling element 30 made up of an extruded multichamber profile 44 with the profile chambers 47-1, 47-2. An inherently rigid and durable coupling element 30 is provided by the profile chambers 47 and walls 34 which delimit the same.

It is possible to see connecting portions 32 and 33, which are formed by through-passages in an upper profile wall 42 and in a lower profile wall 43 of the multichamber profile 44. The first and the second connecting portions 32, 33 are intended to establish a screw connection in the vertical direction Z of the vehicle.

An upper side 37-1 of the connecting portion 32 and an upper side 37-2 of the connecting portion 33 is formed by the upper profile wall 42 and an underside 38 of the connecting portions 32 and 33 is formed by a lower profile wall 43, wherein spacing apart of the upper sides 37-1 and 37-2 is provided by locally different wall thicknesses T1 and T2 of the upper profile wall 42. This provides for different attachment options of the connecting portions at different height positions in the vertical direction Z of the vehicle.

A wall thickness T3 in a portion between the upper side 37-1 and the upper side 37-2 of the upper profile wall 42, said wall thickness being further reduced in relation to the wall thickness T1, provides for optimization in terms of lightweight construction. Said portion contains no further connecting portion. As an alternative, or in addition, this function can be performed by the local arrangement of slots 48 or notches. It is also possible for the slot 48 to be designed in the form of a predetermined deformation location 38, to be arranged specifically in portions of the coupling element which are subjected to high levels of loading.

FIGS. 8A-8D show a further exemplary embodiment of a coupling element according to the disclosure. The coupling element 30 is formed in a number of parts made up of a first individual profile 40-1 and a second individual profile 40-2, wherein the individual profiles 40-1, 40-2 are connected to one another in a form-fitting manner. Individual profile 40-2 is arranged to some extent in the second individual profile 40-1. The second individual profile 40-2 is designed in the form of an extruded multichamber profile 44 and is plugged to some extent into the first individual profile 40-1. It serves to reinforce the coupling element 30 and can also serve to provide for, or to support, connecting portions 32, 33.

The connecting portions 32 each have an upper side 37-1 and onto an underside 38-2 at a distance or a height H3, whereas the other connecting portions 33 have an upper side 37-2 and an underside 38-2 at a distance or a height H1. The upper side 37-1 of the connecting portions 32 is spaced apart from the upper side 37-2 of the other connecting portion 33 in the vertical direction Z of the vehicle. It can also be seen in FIG. 8A that the second individual profile 40-2 has a height H2, which is smaller than the height H1 of the first individual profile 40-1.

Two connecting portions 32 are formed by relatively high sleeve elements 45, whereas the other connecting portions 33 are formed by through-passages 35 in the upper profile wall 42 and the lower profile wall 43 of the first individual profile 40-1. This provides for different attachment options of the connecting portions at different height positions in the vertical direction Z of the vehicle.

It is also possible, albeit not illustrated, for a connecting portion 32, 33 to be formed, in addition, by a profile chamber 47 of the second individual profile 40-2. This means that a profile chamber 47 is arranged in the region of the sleeve elements in the second individual profile 40-2 and is designed such that it accommodates, engages around, or to some extent radially supports, the sleeve element 45. This makes it possible for a joint between the sleeve element 45 and upper and/or lower profile wall 42, 43 of the first individual profile 40-1 to be relieved of loading.

It is possible to see connecting portions 32 and 33, which are formed by through-passages in an upper profile wall 42 and in a lower profile wall 43 of the multichamber profile 44. The first and the second connecting portions 32, 33 are intended to establish a screw connection in the vertical direction Z of the vehicle.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A coupling element for connecting vehicle components of an underfloor arrangement of a battery-powered motor vehicle,
wherein the underfloor arrangement comprises:
a battery holder,
at least one axle arrangement,
the coupling element comprising
at least one first connecting portion for fastening on the axle arrangement, and
at least one planar attachment surface for fastening on the battery holder,
wherein the coupling element has an extruded multichamber profile and at least one second connecting portion for connection to a chassis part, the at least one axle arrangement, a body component, a longitudinal member of the underfloor arrangement, or the battery holder, and
one of
at least one of the first and second connecting portions establishes a screw connection,
at least one of the first and second connecting portions is a profile chamber, or
at least one of the first and second connecting portions is a sleeve element.

2. The coupling element according to claim 1, wherein the at least one planar attachment surface comes into full-surface abutment with the battery holder.

3. The coupling element according to claim 1, wherein
each of the first and second connecting portions has an upper side and an underside,
the upper side of the first connecting portion is spaced apart from the upper side of the second connecting portion in a vertical direction of the vehicle, and
the underside of the first connecting portion is spaced apart from the underside of the second connecting portion in the vertical direction of the vehicle.

4. The coupling element according to claim 3, wherein a spacing between the upper sides and a spacing between the undersides are defined by mechanical structure of the multichamber profile.

5. The coupling element according to claim 1, wherein the coupling element has a longitudinal profile axis which extends perpendicularly in relation to a vertical direction of the vehicle.

6. The coupling element according to claim 1, wherein the first and the second connecting portions are formed by through-passages in an upper profile wall and in a lower profile wall of the extruded multichamber profile.

7. The coupling element according to claim 3, wherein
the upper side and the underside of the first connecting portion are formed by an upper profile wall and a lower profile wall,
the upper side and the underside of the second connecting portion are formed by the upper profile wall and the lower profile wall,
a spacing between the upper sides are defined by different wall thicknesses of the upper profile wall and the lower profile wall, and
a spacing between the undersides are defined by the different wall thicknesses of the upper profile and the lower profile wall.

8. The coupling element according to claim 3, wherein
the upper side and the underside of the first connecting portion are formed by an upper profile wall and a lower profile wall,
the upper side and the underside of the second connecting portion are formed by the upper profile wall and the lower profile wall,
a spacing between the upper sides are defined by different profile chambers of the multichamber profile, and
a spacing between the undersides are defined by different profile chambers of the multichamber profile.

9. The coupling element according to claim 1, further comprising a closure panel, wherein
the coupling element has a longitudinal profile axis which extends parallel to a vertical direction of the vehicle, and the coupling element is at least partially closed by the closure panel on an upper side or an underside of at the coupling element.

10. A coupling element for connecting vehicle components of an underfloor arrangement of a battery-powered motor vehicle,
wherein the underfloor arrangement comprises:
a battery holder,
at least one axle arrangement,
the coupling element comprising
at least one first connecting portion for fastening on the axle arrangement, and
at least one planar attachment surface for fastening on the battery holder, wherein the coupling element has an extruded multichamber profile,
a first individual profile and a second individual profile, wherein the first and second individual profiles are connected to one another in a form-fitting or integral manner, and
at least one intermediate wall, which extends, in a rectilinear or arcuate manner, from the attachment surface toward the first connecting portion to transmit a load.

11. The coupling element according to claim 10, wherein, the first and second individual profiles, on their mutually facing walls, have complementary-formation connecting elements having a groove-and-tongue connection, and are connected to one another in a form-fitting manner.

12. The coupling element according to claim 10, wherein the first individual profile is arranged at least to some extent within the second individual profile.

13. The coupling element according to claim 10, wherein the first individual profile has a longitudinal profile axis which extends at an angle in relation to a longitudinal profile axis of the second individual profile.

14. The coupling element according to claim 10, wherein the first individual profile has an extent in a vertical direction of the vehicle which differs in relation to the second individual profile.

15. The coupling element according to claim 1, wherein the coupling element has at least one wall portion which constitutes a predetermined deformation location such that, when a defined first load level applied to the at least one wall portion is exceeded, the coupling element is deformed, and
the predetermined deformation location is formed in the at least one wall portion by
a reduction in a wall thickness or in a yield strength, or
a wall through-passage, or
a slot, or
a cross-sectional tapering, or
a stamped formation.

16. An underfloor arrangement of a motor vehicle, the underfloor arrangement comprising:
two axle arrangements,
a battery holder arranged between the two axle arrangements,
wherein the battery holder has a plurality of side walls which delimits the battery holder in an outward direction, and
a coupling element comprising
at least one first connecting portion for fastening on at least one of the two axle arrangements, and
at least one planar attachment surface for fastening on the battery holder,
wherein the coupling element has an extruded multi-chamber profile,
wherein the coupling element connects the at least one of the two axle arrangements and the battery holder in a load-directing manner,
wherein the coupling element has at least one intermediate wall, which extends from the first connecting portion as far as the attachment surface of attachment to the battery holder and is configured to transmit a load,
wherein the battery holder has a strut, which extends between opposite first and second side walls among the plurality of side walls of the battery holder,
wherein the strut is arranged opposite to the at least one intermediate wall of the coupling element, and
wherein the load is directed from the first connecting portion of the coupling element, via the intermediate wall, the first side wall and the strut, into the opposite second side wall.

17. The underfloor arrangement of the motor vehicle according to claim 16,
wherein the coupling element is configured to be deformed at a first load level,
wherein the plurality of side walls of the battery holder is a crash frame comprising hollow-chamber profiles and configured to be deformed when a second load level is exceeded, and
wherein the second load level is greater than the first load level, at which the coupling element is configured to be deformed.

* * * * *